June 6, 1939.  W. D. SARGENT ET AL  2,160,912
BRAKE DRUM
Original Filed Dec. 28, 1935
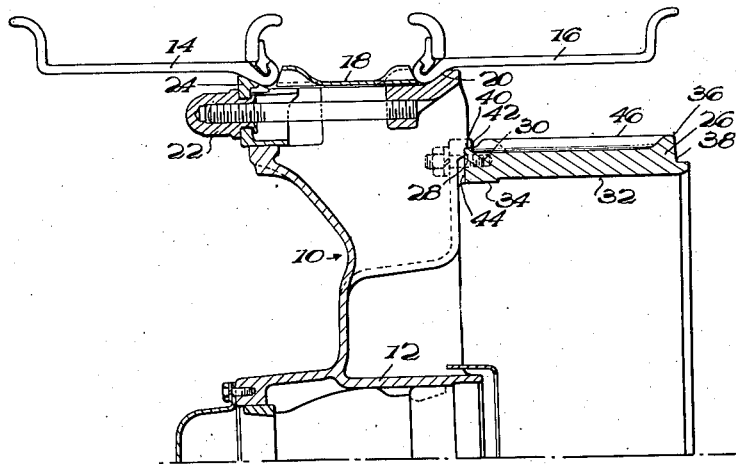
Fig. 1.
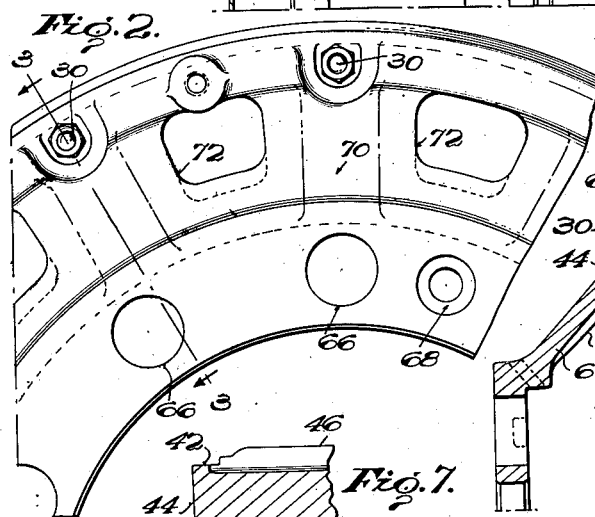
Fig. 2.
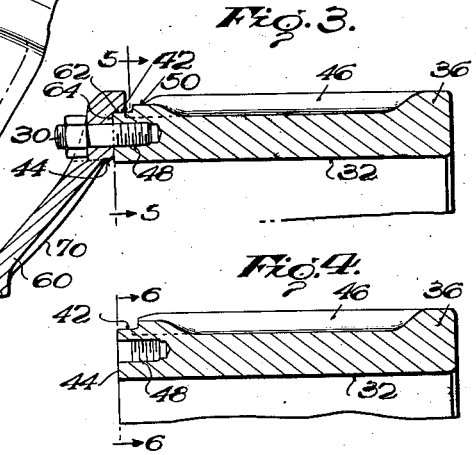
Fig. 3.
Fig. 4.
Fig. 7.
Fig. 8.
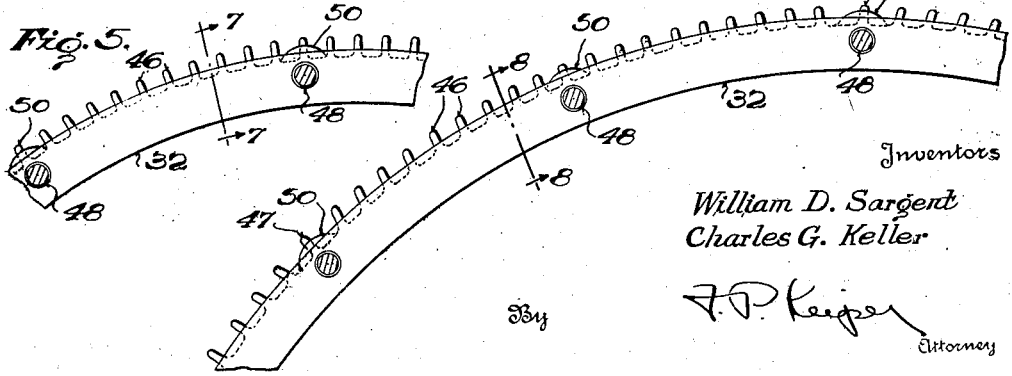
Fig. 5.
Fig. 6.
Inventors
William D. Sargent
Charles G. Keller
By F. P. Keiper
Attorney Patented June 6, 1939

2,160,912

UNITED STATES PATENT OFFICE 2,160,912

BRAKE DRUM

William D. Sargent, New York, and Charles G. Keller, Hyde Park, N. Y.

Application December 28, 1935, Serial No. 56,572
Renewed October 31, 1938

14 Claims. (Cl. 188—218)

This invention relates to brake drums and more particularly to brake drum rings of a heavy duty type adapted for automotive vehicle internal expanding brakes. The invention has to do with a structure employing longitudinally-arranged cooling fins and circumferential flanges, and which structure may, if desired, be readily formed of cast iron or other cast materials which may be suitable for the purpose.

Accordingly, an object of the invention is to provide a brake drum having an internal friction surface and an external heat radiating surface of improved form.

A further object of the invention is to provide a brake drum having an internal friction surface and external longitudinally-arranged cooling fins rooted in external circumferential flanges.

A still further object of the invention is to provide a brake drum wherein longitudinal externally-arranged cooling fins are employed which are arranged in casting groups, and in which all the fins of one group extend outwardly parallel to one another whereby a mold made of sectors corresponding to the casting group may be drawn radially away from the drum after casting.

Yet another object of the invention is to provide a cast brake drum structure not only efficient as a finished article but whose structure is such as to facilitate the casting operation.

Yet a further object of the invention is the provision of a brake drum structure which may be cast in multiple and thereafter cut into individual drums with a saving in finishing expense.

Other objects of the invention have to do with the provision of a strong well-braced cast drum, economical of manufacture, with provision for long wear in service.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing wherein like reference numerals indicate like parts,

Fig. 1 illustrates a section through a heavy duty wheel and brake drum illustrating its relation therewith;

Fig. 2 is an end elevation of a diaphragm or independent supporting structure for a brake drum;

Fig. 3 is a section through Fig. 2 taken on the line 3—3 showing the diaphragm in section together with the attached brake drum ring;

Fig. 4 is a section through a slightly modified brake drum ring;

Fig. 5 is a fragmentary end elevation of the brake drum ring structure of Fig. 3 as viewed from the line 5—5;

Fig. 6 is a fragmentary elevation of the brake drum ring structure of Fig. 4 as viewed from the line 6—6;

Fig. 7 is a section taken on the line 7—7 of Fig. 5;

Fig. 8 is a section taken on the line 8—8 of Fig. 6.

Referring to the drawing and particularly to Fig. 1, there is shown a wheel structure 10 having a hub 12 and carrying demountable rims 14 and 16, the rims being spaced by a spacing member 18 and supported on the wheel structure by engagement with the shoulder 20 and demountable rim fastening nuts 22 and associated collars 24.

On one side of the wheel structure and underneath the rim 16 in spaced relation is carried, a brake drum ring 26, the same being seated in chairs 28 formed in the spoke structure of the wheel and held in place by studs 30 threaded into the brake drum. Preferably the brake drum comprises a cast structure with the inner surface 32 finished for frictional engagement with a brake shoe assembly, the structure of which is well understood in the art and is not illustrated herein. The friction surface 32 may terminate short of the inner edge of the brake drum leaving an inwardly extending annular shoulder portion 34 which may cooperate to increase the strength of the drum adjacent the holding studs 30.

The exterior surface of the brake drum is provided with a flange 36 on the outer edge, which may, if desired, be cut away as at 38 to nest with a cover plate associated with the brake shoe assembly. The exterior surface along the inner edge is also provided with a flange 40, which flange is, during the process of manufacture, finished along its outer cylindrical surface 42 and its face 44 so as to nest tightly and securely in the chairs 28 provided in the supporting wheel structure.

Extending between flanges 36 and 40 are a plurality of longitudinally-arranged cooling fins 46 which may as in Fig. 5 be radial, or as in Fig. 6 be arranged in groups or sections, the central fins of which are radial and the others parallel therewith for a reason hereinafter to be set forth. In such an arrangement the adjacent sections may be divided by a single radial fin such as 47.

As illustrated particularly in Figs. 1, 7 and 8, the fins will be seen to be rooted in the flanges 36 and 40 so that in practice they are protected against possible fracture and probable resulting drum unbalance.

At spaced intervals along its inner edge or face 44 is provided a series of threaded apertures 48 for reception of studs 30, the apertures being reinforced on the outer surface by a bulbous thickened rim portion 50, and also, as in Fig. 1 such reinforcement may consist in the portion 34 of increased thickness adjacent the inner cylindrical braking surface 32. The bulbous reinforcements permit the placing of the bolt holes radially outward from the center of the brake drum structure proper so that exceptional wear may take place on the inner friction surface without endangering the strength of the securing means.

The diaphragm structure 60 of Figs. 2 and 3 may be employed to adapt the brake drum to wheel structures not specifically providing for the direct attachment as illustrated in Fig. 1. Such a diaphragm necessarily may take various forms and is provided with finished surfaces 62 and 64 for snugly receiving the finished surfaces 42 and 44 of the inner drum edge and flange and also a series of holes for accommodating the securing studs 30. The inner edge of the diaphragm is also provided with apertures 66 and 68 for securing to a wheel hub structure in any suitable manner. The diaphragm may also be braced by radial webs such as 70 and lightened by providing apertures 72 which may also aid in cooling the interior of the brake drum.

The brake drums themselves are preferably cast in multiple, a single casting including, for example, two or more drums. They may be centrifugally cast or statically cast, and the rough casting cut into individual brake drums, the severing cut serving to partially finish the edges of the adjacent drums. In order to cast the radial fins of Fig. 5, molds are made up corresponding thereto in any desired manner. The structure of Fig. 6 wherein the fins are arranged in sections, all the fins of any one section being parallel to a central fin, is peculiarly adapted to be cast in a mold provided with sector cores corresponding to the sections and which cores may be of the more or less permanent variety, it being obvious that the destruction of the core sections is not necessary upon drawing because of the fin arrangement.

There has thus been described a brake drum structure which is peculiarly adapted for heavy loads and efficient uniform cooling during operation, which structure is substantially symmetrical and exceptionally strong as a result of the flanges protecting against bell mouthing and rooted fins which produce combined circumferential and transverse bracing. Also because of the flange and fin structure, pouring is simplified, and easy flow is afforded to all parts of the drum during casting which results in uniform micro structure and even cooling. The structure also permits of multiple casting with resulting economy of finishing operation and further, sufficient provision is made for wear without interference with the supporting structure.

Although the invention has been illustrated and described in connection with several slightly varying modifications, it is to be understood that the invention is not limited thereto but may be embodied in various modified forms. As many changes in the construction and arrangement may be made without departing from the spirit of the invention as will be apparent to those skilled in the art, reference will be had to the appended claims for a definition of the limits of the invention.

What is claimed is:

1. A cast iron brake drum comprising a single piece cylindrical shell having an internal brake shoe engaging friction surface, an external flange along one edge and a plurality of closely spaced axially-extending uninterrupted cooling fins rooted in said flange.

2. A cast iron brake drum comprising a single element cylindrical shell having an internal brake shoe engaging friction surface, an external flange along one edge, a plurality of axially-extending uninterrupted cooling fins of uniform radial height throughout their length rooted in said flange, and means along the other edge for securing the drum to a rotatable support.

3. A cast iron brake drum comprising a single element cylindrical shell having an internal cylindrical brake shoe engaging friction surface, an external flange along one edge, and a plurality of axially and radially-extending cooling fins uniformly spaced around the exterior of said shell, said cooling fins being uninterrupted and rooted at one end in said flange and having a substantially uniform radial height.

4. A cast iron brake drum comprising a single element cylindrical shell having an internal cylindrical brake shoe engaging friction surface, an external flange along one edge, and a plurality of axially and radially-extending cooling fins uniformly spaced at distances substantially equal to their radial height around the exterior of said shell, said cooling fins being uninterrupted and rooted at one end in said flange and having a substantially uniform radial height and having a length substantially that of the brake drum.

5. A brake drum comprising a single piece cylindrical member having an inner cylindrical friction surface, an outwardly-extending flange at each end and a plurality of cooling fins substantially radially arranged on the outer surface, said fins having their ends rooted in said flanges.

6. A brake drum comprising a cylindrical member having an inner cylindrical friction surface, a plurality of longitudinally-arranged cooling fins extending substantially parallel with the drum axis on the outer surface, said cooling fins being arranged in groups, all the fins of each group extending in a direction from the drum parallel with a central fin in the group.

7. A brake drum comprising a cylindrical member having an inner cylindrical friction surface, a plurality of longitudinally-arranged cooling fins extending substantially parallel with the drum axis on the outer surface, said cooling fins being arranged in groups, all the fins of each group extending in a direction from the drum parallel with a central fin in the group, and said groups being bounded by a single radial fin common to the adjacent groups.

8. A brake drum comprising a single cylindrical cast member having an inner cylindrical brake shoe engaging friction surface and an outwardly-extending flange on each edge of the drum, and a plurality of spaced fins extending from one flange to the other.

9. A brake drum comprising a cylindrical member having an inner cylindrical friction surface and an outwardly-extending flange at each edge of the drum, a plurality of spaced fins extending from one flange to the other and rooted therein, and means for securing said rim to a supporting structure comprising a finished end face, a finished cylindrical surface on the outer edge of the adjacent flange, and a plurality of spaced fastening means in said face, said spaced fastening means being located at a point radially outward from the center of the drum structure cross section.

10. A cast brake drum comprising a cylindrical member having an inner cylindrical friction surface and an outwardly-extending circumferential flange at each edge, spaced cooling fins of substantially uniform height extending from one flange to the other, and a series of spaced bulbous enlargements on the outer surface adjacent one edge, and threaded apertures to receive securing studs extending longitudinally into the center of said member and enlargements.

11. In the method of making a one piece brake drum comprising a plurality of segments along its outer arcuate surface, the step of forming each segment with a plurality of elemental circumferentially spaced apart heat radiating fins each parallel to the other and to a central fin in the segment.

12. In the method of making a segment of a brake drum, the step of forming a plurality of elemental circumferentially spaced apart heat radiating fins each substantially parallel to a plane passing through the axis of the brake drum and the bisector of the angle subtended by the segment.

13. In the method of making a segment of a brake drum, the step of forming a plurality of spaced apart heat radiating fins, along the outer arcuate surface thereof, each fin extending outwardly from the drum and in a direction such that any section through any fin taken on a plane perpendicular to the drum axis extends substantially parallel to the bisector of the included angle of the segment.

14. A brake drum comprising a cylindrical member having an inner cylindrical friction surface, a plurality of closely spaced cooling fins on the outer surface arranged in groups forming sectors, all the fins in any one sector extending throughout their length outwardly from the drum and in a direction such that any section through any fin of a particular sector taken on a plane perpendicular to the drum axis extends substantially parallel to the bisector of the included angle of the sector.

WILLIAM D. SARGENT.
CHARLES G. KELLER.